United States Patent
Suzuki et al.

(10) Patent No.: US 9,116,693 B2
(45) Date of Patent: *Aug. 25, 2015

(54) ARITHMETIC UNIT AND ARITHMETIC PROCESSING METHOD FOR OPERATING WITH HIGHER AND LOWER CLOCK FREQUENCIES

(75) Inventors: Daisuke Suzuki, Tokyo (JP); Minoru Saeki, Tokyo (JP); Yuichiro Nariyoshi, Tokyo (JP)

(73) Assignee: RENESAS ELECTRONICS CORPORATION, Kanagawa (JP)

(*) Notice: Subject to any disclaimer, the term of this patent is extended or adjusted under 35 U.S.C. 154(b) by 587 days.

This patent is subject to a terminal disclaimer.

(21) Appl. No.: 13/443,507

(22) Filed: Apr. 10, 2012

(65) Prior Publication Data

US 2012/0198211 A1 Aug. 2, 2012

Related U.S. Application Data

(63) Continuation of application No. 12/604,806, filed on Oct. 23, 2009, now Pat. No. 8,219,847.

(30) Foreign Application Priority Data

Nov. 13, 2008 (JP) ................................ 2008-291177

(51) Int. Cl.
  *G06F 1/04* (2006.01)
  *G06F 1/32* (2006.01)
(52) U.S. Cl.
  CPC .............. *G06F 1/3203* (2013.01); *G06F 1/324* (2013.01); *Y02B 60/1217* (2013.01)
(58) Field of Classification Search
  USPC .......................... 713/300, 310, 320, 600, 601
  See application file for complete search history.

(56) References Cited

U.S. PATENT DOCUMENTS 5,649,174 A * 7/1997 Dockser ........................ 713/501
5,767,747 A 6/1998 Pricer
(Continued)

FOREIGN PATENT DOCUMENTS

JP 2004-206409 7/2004

OTHER PUBLICATIONS

Office Action for U.S. Appl. No. 13/023,188 dated Mar. 20, 2013.
(Continued)

*Primary Examiner* — Zahid Choudhury
(74) *Attorney, Agent, or Firm* — McDermott Will & Emery LLP

(57) ABSTRACT

There is a need for providing a battery-less integrated circuit (IC) card capable of operating in accordance with a contact usage or a non-contact usage, preventing coprocessor throughput from degrading despite a decreased clock frequency for reduced power consumption under non-contact usage, and ensuring high-speed processing under non-contact usage. A dual interface card is a battery-less IC card capable of operating in accordance with a contact usage or a non-contact usage. The dual interface card operates at a high clock under contact usage and at a low clock under non-contact usage. A targeted operation comprises a plurality of different basic operations. The dual interface card comprises a basic arithmetic circuit group. Under the contact usage, the basic arithmetic circuit group performs one basic operation of the targeted operation at one cycle. Under the non-contact usage, the basic arithmetic circuit group sequentially performs at least two basic operations of the targeted operation at one cycle.

2 Claims, 7 Drawing Sheets

(56) References Cited

U.S. PATENT DOCUMENTS

| | | |
|---|---|---|
| 5,844,830 A | 12/1998 | Gorshtein et al. |
| 6,927,072 B2 | 8/2005 | Molla et al. |
| 7,243,217 B1 | 7/2007 | Oliver et al. |
| 7,937,568 B2 | 5/2011 | Correale et al. |
| 2002/0038418 A1 | 3/2002 | Shimamura |
| 2009/0182987 A1* | 7/2009 | Mejdrich et al. ............ 712/215 |
| 2009/0319760 A1 | 12/2009 | Froemming et al. |

OTHER PUBLICATIONS

Sumio Morioka et al., "An Optimized S-Box Circuit Architecture for Low Power AES Design," CHES 2002, LNCS vol. 2523, pp. 175-186.

* cited by examiner

ARITHMETIC UNIT AND ARITHMETIC PROCESSING METHOD FOR OPERATING WITH HIGHER AND LOWER CLOCK FREQUENCIES

CROSS-REFERENCE TO RELATED APPLICATIONS

This application is a Continuation of U.S. application Ser. No. 12/604,806, filed on Oct. 23, 2009 now U.S. Pat. No. 8,219,847, claiming priority of Japanese Patent Application No. 2008-291177, filed on Nov. 13, 2008, the entire contents of each of which are hereby incorporated by reference.

BACKGROUND OF THE INVENTION

The present invention relates to an arithmetic unit capable of encryption suitable for a contact usage and a non-contact usage incorporated into a single IC (Integrated Circuit) chip used for a dual interface card.

Recently, a non-contact battery-less IC card is increasingly used for an automatic ticket gate in transport facilities or an office entry. According to the non-contact type or technique, an IC card generates operating power from a radio wave contactlessly received from a reader/writer as a destination device.

A contact IC card is generally used for such systems as an ATM (Automated Teller Machine) for banks and an ETC (Electronic Toll Collection System) mounted on vehicles. According to the contact type or technique, an IC card is directly coupled to an ETC-equipped device as a destination device and is supplied with operating power from the ETC-equipped device while maintaining the coupled state.

There is a need from infrastructure users to carry as few cards as possible. Utilization information needs to be shared among infrastructures for sophisticated functionality. For these reasons, dual interface cards are increasingly used so as to be compatible with the contact and non-contact usages. In the dual interface card, the single IC chip provides both techniques. This is highly advantageous for embodying the dual interface card in terms of costs and capabilities.

However, the operating requirement of the IC chip greatly varies under the contact usage and the non-contact usage. In particular, the operating requirement of the non-contact usage needs to perform necessary processes while less power is consumed than the contact usage and the power consumption is prevented from being varied. Generally, the non-contact usage supplies the IC chip with a clock frequency lower than the contact usage.

In the IC chip in accordance with the conventional dual interface card, the electric energy supplied to the IC chip is monitored, and when the received electric energy is low, the function inside the IC chip is partially stopped, to reduce the power consumption. According to Patent Document 1, for example, an IC chip includes a CPU (Central Processing Unit), memory, and a coprocessor. When a result of monitoring the electric energy indicates the non-contact usage, the IC chip stops supplying clocks to the CPU and the memory during a coprocessor operation or to the coprocessor and the memory during a CPU operation. This reduces the power consumption. When a result of monitoring the electric energy indicates the contact usage, the IC chip allows the CPU, the memory, and the coprocessor to operate parallel. This ensures high-speed operations.

The IC chip uses the coprocessor that typically performs the encryption. Non-Patent Document 1 proposes a conventional technology that reduces power consumption of the coprocessor for encryption by miniaturizing the circuit scale and preventing variations in signal arrival times.

Patent Document 1: Japanese Unexamined Patent Publication No. 2004-206409, Non-contact IC card Non-Patent Document 1: Morioka, S. and Satoh, A.: An Optimized S-Box Circuit Architecture for Low Power AES Design, CHES2002, LNCS Vol. 2523, pp. 172-186 (2002)

SUMMARY OF THE INVENTION

The conventional technology according to Patent Document 1 does not change the configuration or operations of the coprocessor itself. As mentioned above, the coprocessor throughput degrades in accordance with a decreased clock frequency when the operation uses a clock frequency that is used under the non-contact usage and is lower than the contact usage. When a frequency used under the non-contact usage is one nth of the contact usage, this signifies that the coprocessor throughput also degrades one nth. Namely, the throughput greatly degrades just by decreasing the clock frequency or allowing or disallowing the clock supply.

On the other hand, the technology described in Non-Patent Document 1 optimizes the configuration of the coprocessor itself, making it possible to reduce the power consumption. According to this technology, however, decreasing the non-contact usage frequency to one nth of the contact usage also degrades the coprocessor throughput one nth. Decreasing the frequency directly degrades the throughput.

The present invention has been made in consideration of the foregoing. It is therefore an object of the present invention to provide an arithmetic unit capable of preventing the coprocessor throughput from degrading despite a decreased clock frequency for reduced power consumption and ensuring high-speed processing under non-contact usage.

An arithmetic unit according to the invention is supplied with a clock and is capable of performing an operation in any of high clock mode and low clock mode and comprises an execution section. The high clock mode supplies a specified clock frequency. The low clock mode supplies a specific clock frequency lower than that of the high clock mode. In the high clock mode, the execution section performs one of a plurality of different basic operations included in a targeted operation at one cycle of the clock frequency.

In the low clock mode, the execution section sequentially performs at least the two basic operations of the targeted operation at one cycle of the clock frequency.

The invention may provide an IC card capable of preventing the coprocessor throughput from degrading despite a decreased clock frequency for reduced power consumption and ensuring high-speed processing under non-contact usage.

DETAILED DESCRIPTION OF THE PREFERRED EMBODIMENTS

First Embodiment

Figure 1:
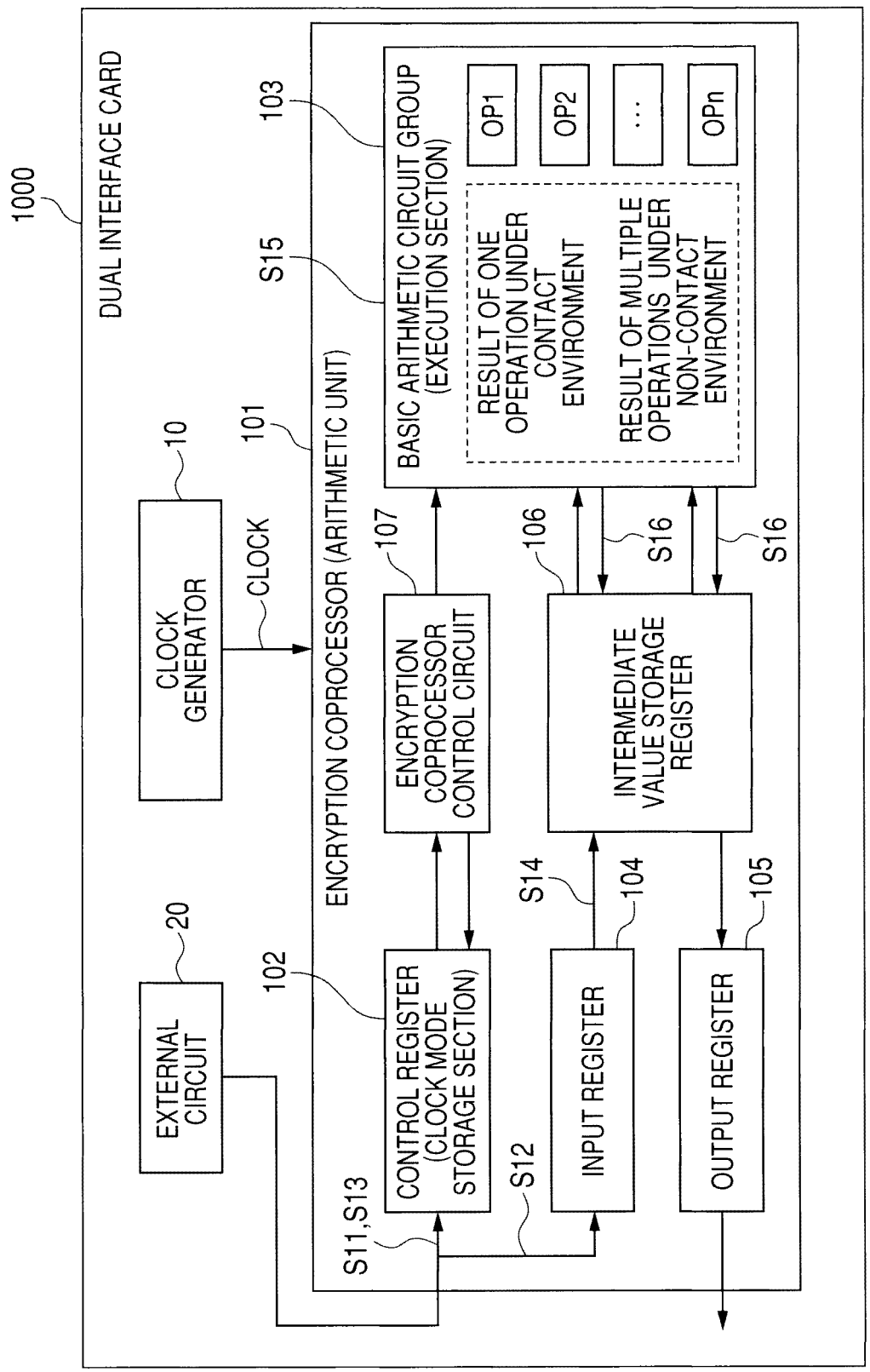
FIG. 1 is a block diagram showing a dual interface card 1000 according to a first embodiment.
Figure 2:
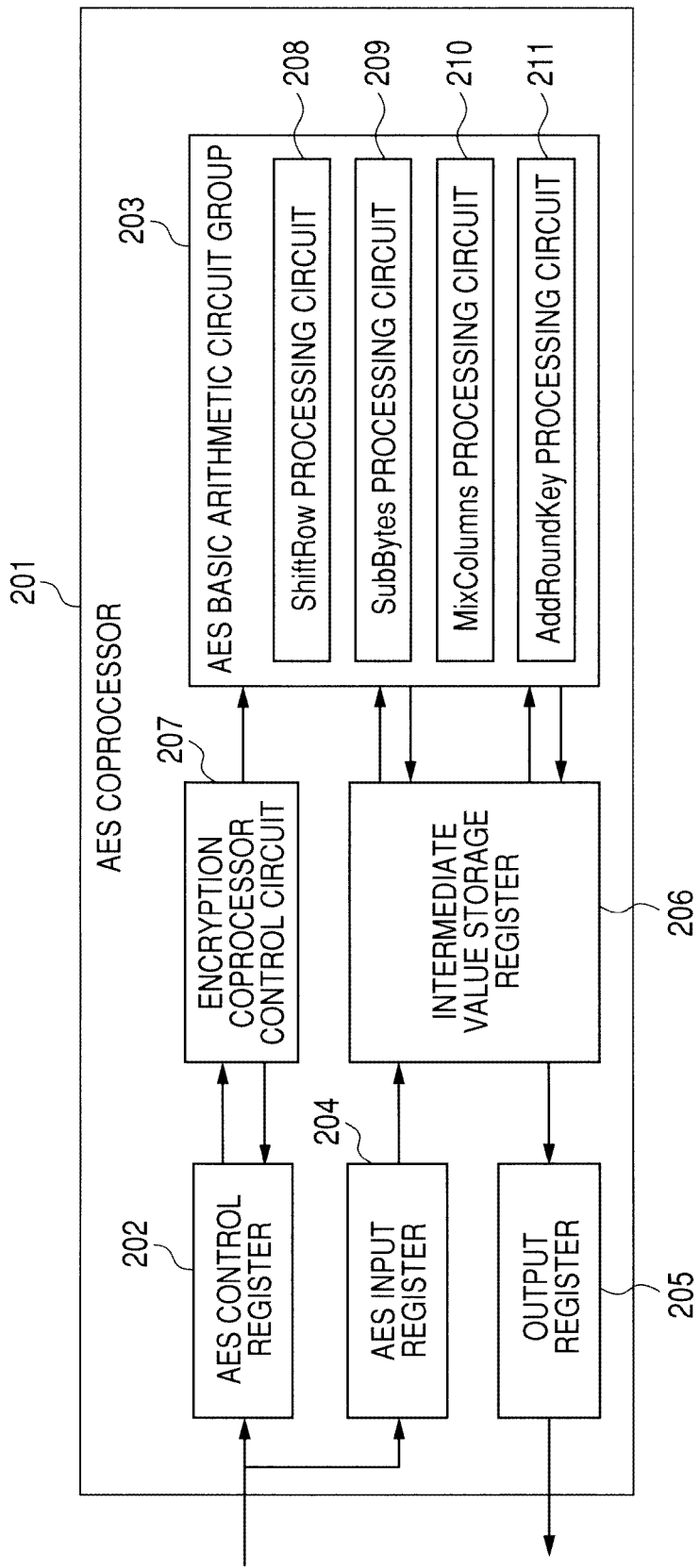
FIG. 2 is a block diagram showing an AES coprocessor 201 according to the first embodiment.
Figure 3:
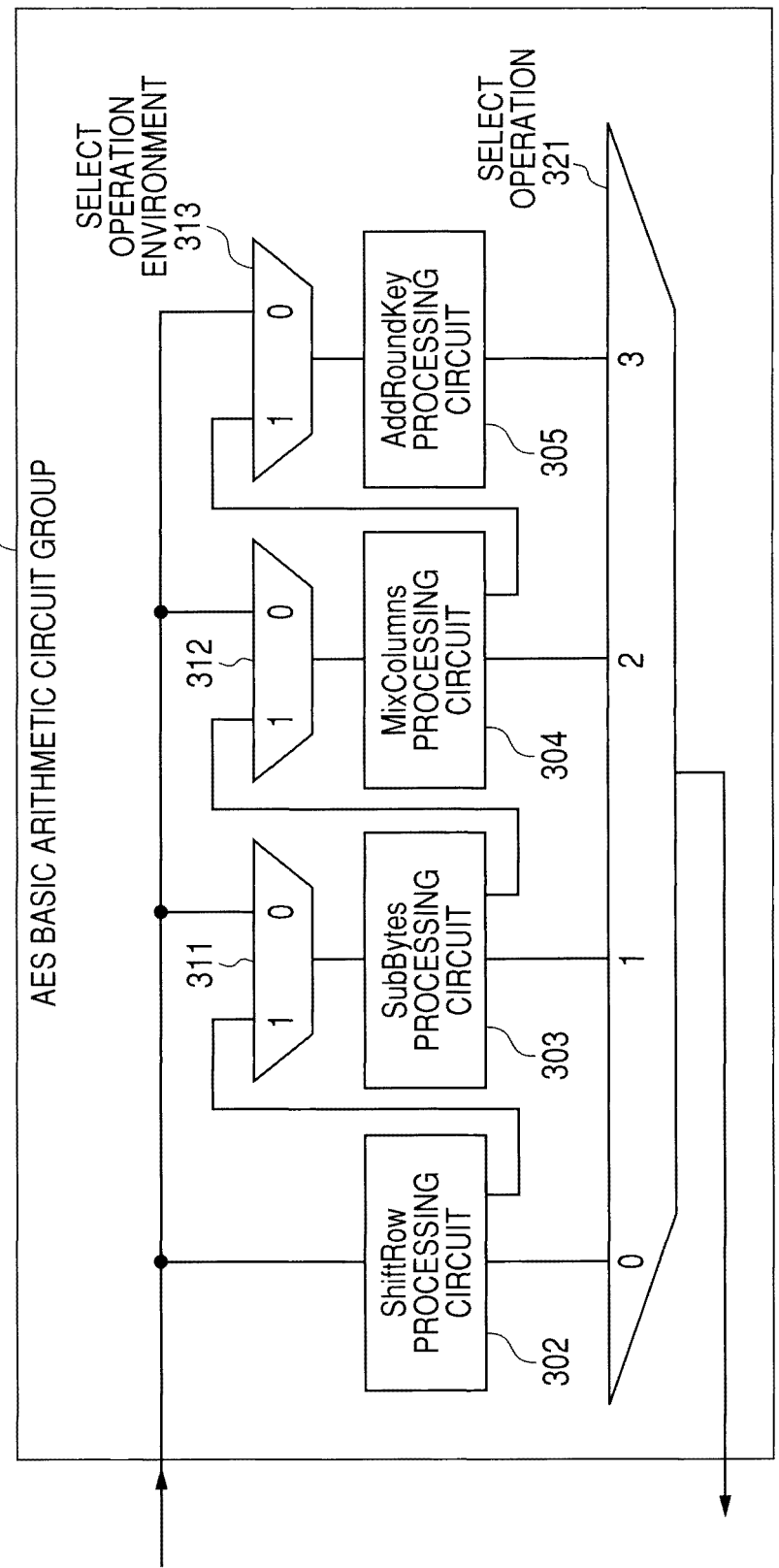
FIG. 3 is a block diagram showing an AES basic arithmetic circuit group 301 according to the first embodiment.

The following describes an IC chip according to the first embodiment with reference to FIGS. 1 through 3. The first through third embodiments provide contact and non-contact usages for describing changeover between operation modes (arithmetic processing techniques). This is just an example. Depending on product uses, for example, IC chip specifications differ from each other in terms of operating voltages, operating frequencies, and consumption currents. The product uses may include transport facilities such as ETC, financial facilities such as cash cards or credit cards, communication facilities such as mobile telephones, and combinations of these.

The first embodiment will be described. FIG. 1 is a block diagram showing a dual interface card 1000 (IC card) according to the first embodiment. FIG. 1 shows only major components of the dual interface card 1000. The dual interface card 1000 is a battery-less IC card that is supplied with operating power from a destination device. The dual interface card 1000 includes a clock generator 10 for generating clocks, an external circuit (e.g., CPU) 20, and an encryption coprocessor 101 exemplifying an arithmetic unit. The encryption coprocessor 101 is an arithmetic unit that is supplied with clocks from the clock generator 10 and performs arithmetic operations. As will be described later, the encryption coprocessor 101 is capable of arithmetic operations in any of high clock mode and low clock mode. The high clock mode provides the contact usage that supplies a specified clock frequency (fc). The low clock mode provides the non-contact usage that supplies a specified clock frequency (fl) lower than the contact usage.

The encryption coprocessor 101 (arithmetic unit) includes a control register 102 (clock mode storage section), an input register 104, an output register 105, an intermediate value storage register 106, an encryption coprocessor control circuit 107, and a basic arithmetic circuit group 103 (execution section).

The input register 104 stores operation data supplied from an external circuit such as the CPU. The output register 105 stores an operation result. The intermediate value storage register 106 stores an intermediate value that is generated during encryption algorithm processing. Depending on apparatus embodiments, the output register 105 and the intermediate value storage register 106 may share all or part of the input register 104 in common. FIG. 1 independently diagrams the output register 105 and the intermediate value storage register 106 for ease of the description to follow.

The encryption coprocessor 101 processes a specific encryption algorithm. Encryption algorithm examples include AES, SHA-256, and RSA (registered trademark). The encryption algorithm is an example of arithmetic operations to be processed and includes n types of processes ranging from basic process OP1 to OPn as basic processes (basic operations). Further, fc signifies the maximum operating frequency in the contact usage or technique and fl signifies the maximum operating frequency in the no-contact usage or technique. The maximum operating frequency fc in the contact usage is assumed to be much greater than the maximum operating frequency fl in the non-contact usage expressed as follows.

$$fc \gg fl$$

For example, fc is assumed to be approximately 20 MHz and fl to be approximately 3.6 MHz. The basic processes OP1 through OPn are assumed to be capable of configuring an arithmetic unit that can perform each process at one cycle of the clock frequency fc or lower.

Features of the Encryption Coprocessor 10

The encryption coprocessor described in the first through third embodiments includes the control register 102 that is notified of the operation mode such as the contact or non-contact usage. Under the contact usage approximate to the operation clock fc, the basic arithmetic circuit group 103 performs anyone of the basic processes OP1 through OPn at one cycle. Under the non-contact usage approximate to the operation clock fl, the basic arithmetic circuit group 103 performs a given combination of the basic processes OP1 through OPn at one cycle. Operations will be described below.

Description of Operations.

The following describes the operations.

(1) The external circuit 20 supplies the operation usage to the control register 102 (S11).

(2) The external circuit 20 then supplies operation data to the input register 104 (S12).

(3) The external circuit 20 supplies "operation start notification" to the control register 102 as soon as the input register 104 is supplied with the operation data (S13).

(4) When the control register is supplied with "operation start notification", the encryption coprocessor 101 transfers the operation data in the input register 104 to the intermediate value storage register 106 (S14).

(5) The basic arithmetic circuit group 103 processes the operation data stored in the intermediate value storage register 106 at one cycle of operation directed from the encryption coprocessor control circuit 107 (S15).

(6) The basic arithmetic circuit group 103 stores an operation result in the intermediate value storage register 106 (S16).

Contents Settled by the Encryption Coprocessor Control Circuit 107

(1) The operation requirement assigned to the control register 102 may indicate the contact usage, i.e., an example of high clock mode information. In such case, the basic arithmetic circuit group 103 performs one of the basic processes OP1 to OPn at one cycle. Let us suppose that the control register 102 is assigned the contact usage (high clock mode information) as the operation requirement. In this case, the encryption coprocessor control circuit 107 allows the basic arithmetic circuit group 103 to perform one of the basic processes OP1 to OPn. The clock generator 10 supplies a clock equivalent to fc. Since fc is a high frequency, the basic arithmetic circuit group 103 performs only one basic process (basic arithmetic operation) at one cycle.

(2) The operation requirement assigned to the control register 102 may indicate the non-contact usage (low clock mode information). In such case, the basic arithmetic circuit group 103 performs a combination of the basic processes OP1 to OPn at one cycle. Let us suppose that the control register 102 is assigned the non-contact usage as the operation requirement. In this case, the encryption coprocessor control circuit 107 allows the basic arithmetic circuit group 103 to perform a combination of the basic processes OP1 to OPn. The clock generator 10 supplies a clock equivalent to fl lower than fc.

Since the frequency fl is much lower than fc, the basic arithmetic circuit group 103 performs multiple basic processes (basic arithmetic operations) at one cycle.

(3) The basic arithmetic circuit group 103 subsequently performs the operation on data stored in the intermediate value storage register 106. The basic arithmetic circuit group 103 performs all the operations needed as the encryption algorithm. When the basic arithmetic circuit group 103 completes the operations, data in the intermediate value storage register 106 is transferred to the output register 105. The encryption coprocessor control circuit 107 notifies the external circuit 20 that the operations are complete.

FIG. 2 shows an AES coprocessor 201 based on AES as the encryption algorithm (arithmetic operation) for processing. The AES coprocessor 201 is equivalent to the encryption coprocessor 101 in FIG. 1. In terms of components, an AES control register 202 is equivalent to the control register 102 of the encryption coprocessor 101 and so on.

Generally, the AES encryption repeatedly performs the following four operations in combination with each other.
  (1) ShiftRow operation
  (2) SubBytes operation
  (3) MixColumns operation
  (4) AddRoundKey operation
As shown in FIG. 2, an AES basic arithmetic circuit group 203 includes circuits for performing these processes.

Contact Usage fc

The encryption is performed in the AES coprocessor 201 under the contact usage as follows. The AES basic arithmetic circuit group 203 applies one operation (basic operation) specified by an encryption coprocessor control circuit 207 to data from an intermediate value storage register 206. The AES basic arithmetic circuit group 203 stores a result in the intermediate value storage register 206. The following describes how to perform a process called the round function according to AES.

(1) A ShiftRow processing circuit 208 performs the ShiftRow operation on a value of the intermediate value storage register 206.

(2) A SubBytes processing circuit 209 performs the SubBytes operation on the result of (1).

(3) A MixColumns processing circuit 210 performs the MixColumns operation on the result of (2).

(4) An AddRoundKey processing circuit 211 performs the AddRoundKey operation on the result of (3).

The contact usage supplies a high clock equivalent to fc. In this case, the processes (1) to (4) each are performed every cycle. Consequently, the whole of the processes requires four cycles.

Non-Contact Usage fl

The non-contact usage supplies a low clock equivalent to fl lower than the clock for the contact usage. The AES basic arithmetic circuit group 203 changes the operation mode from the contact usage fc so as to perform a combination of the four processes at one cycle. The AES basic arithmetic circuit group 203 performs the processes (1) to (4) at one cycle.

FIG. 3 shows in detail the AES basic arithmetic circuit group 203 in FIG. 2. An AES basic arithmetic circuit group 301 in FIG. 3 an embodiment of the AES basic arithmetic circuit group 203 in FIG. 2. With reference to FIG. 3, the following describes FIG. 2 in more detail.

Contact Usage fc

Under the contact usage, three multiplexers 311 to 313 shown at the top of FIG. 3 select inputs at 0 sides in accordance with the configuration of the AES control register 202. A multiplexer 321 shown at the bottom of FIG. 3 selects and outputs an operation in accordance with a signal value issued from the encryption coprocessor control circuit 207. For example, the selection of the SubBytes operation corresponds to signal value "1" issued from the encryption coprocessor control circuit 207.

Non-Contact Usage fl

Under the non-contact usage, the three multiplexers 311 to 313 shown at the top of FIG. 3 select inputs at 1 sides in accordance with the configuration of the AES control register 202. The encryption coprocessor control circuit 207 issues a signal value set to "3" so as to select a result of performing all the four operations.

The dual interface card 1000 according to the first embodiment changes the operation modes in accordance with the operation requirement stored in the control register 102. This enables fast arithmetic processing in accordance with the contact or non-contact usage or different product standards.

Second Embodiment

Figure 4:
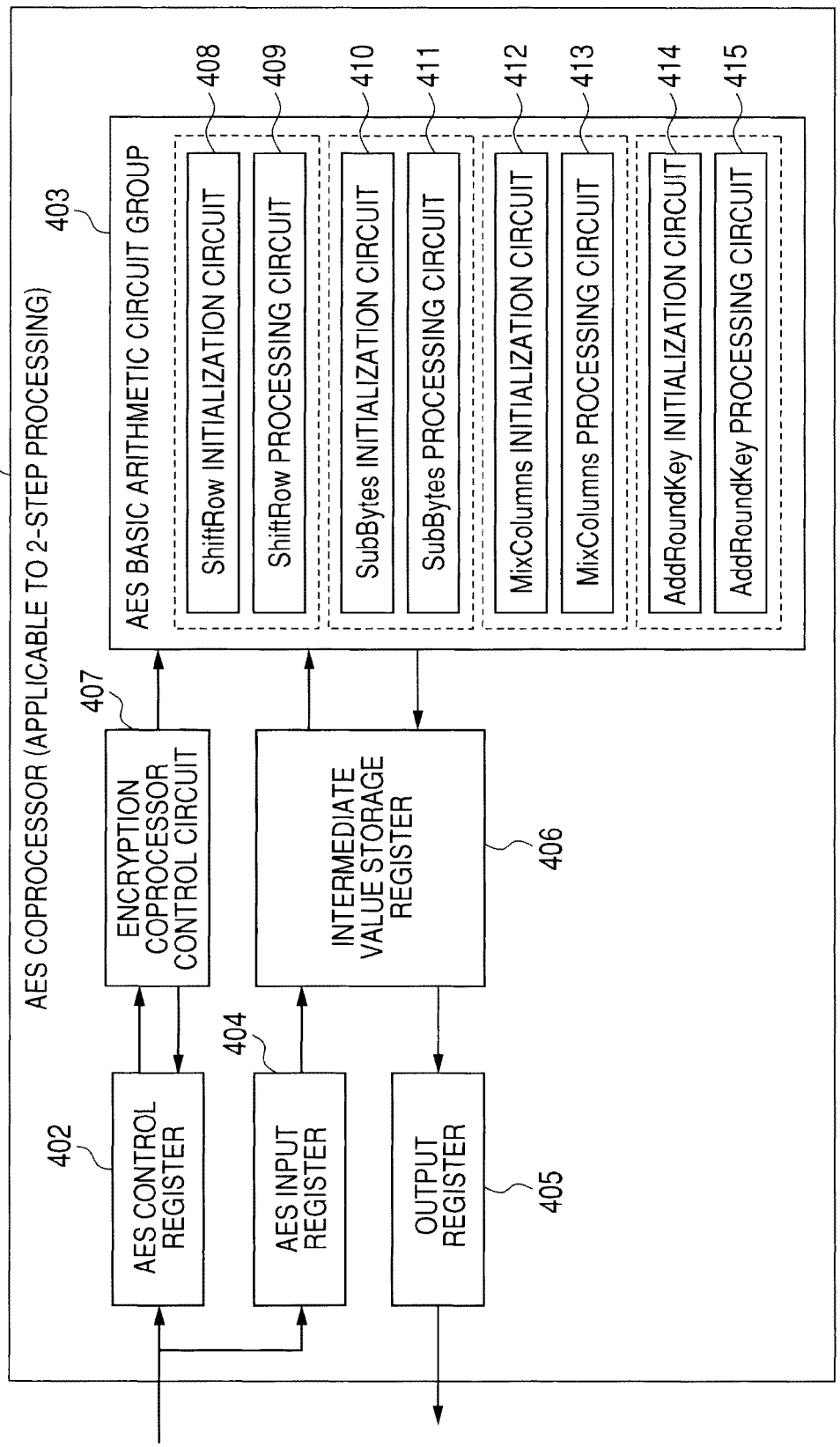
FIG. 4 is a block diagram showing an AES coprocessor 401 according to a second embodiment.
Figure 5:
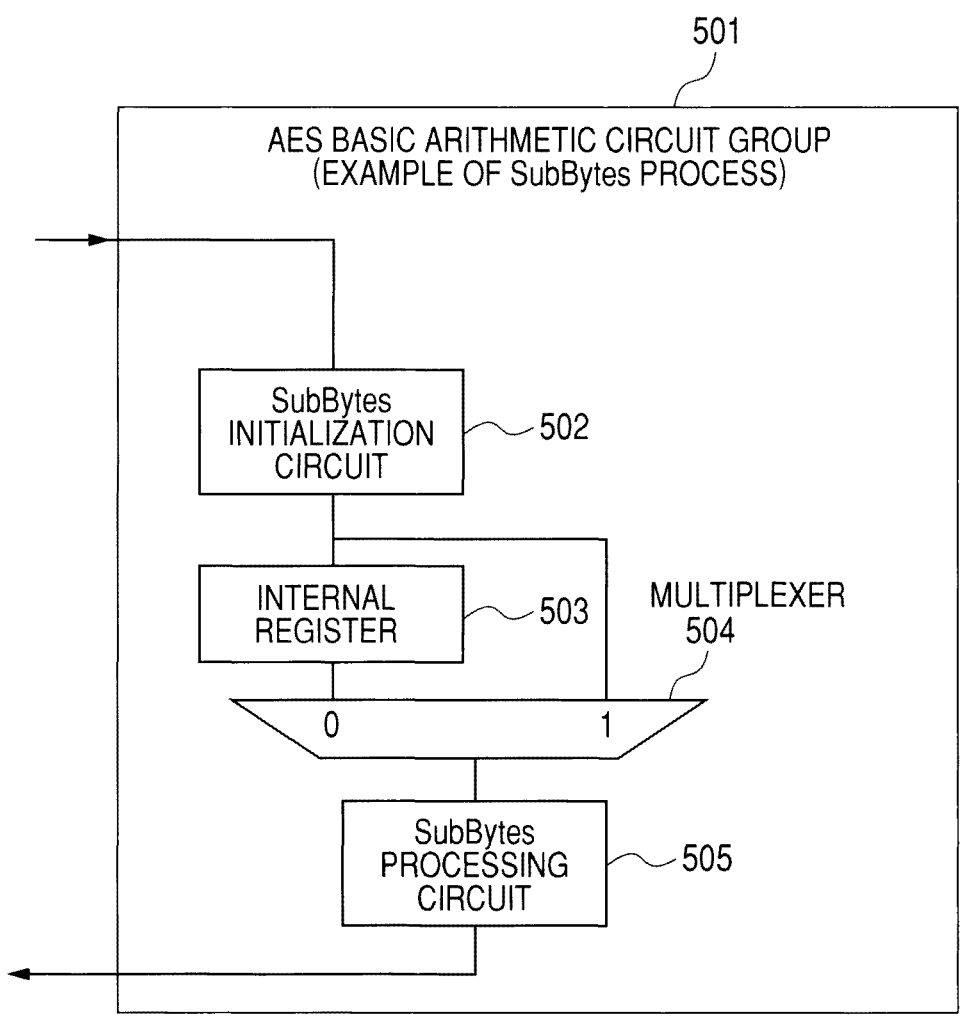
FIG. 5 is a block diagram showing an AES basic arithmetic circuit group 501 according to the second embodiment.

The following describes the second embodiment with reference to FIGS. 4 and 5. For secure implementation, the encryption coprocessor in the IC card uses a technique of dividing an algorithm process into two stages, i.e., an initialization process and a normal process. The encryption algorithm may include n types of processes ranging from the basic process (basic operation) OP1 to OPn. The initialization process is performed before each basic process (normal process). To perform the basic process OP1, the OP1 initialization process is followed by the OP1 normal process. Accordingly, the initialization process requires twice as many cycles as that of the normal process only. The second embodiment will be described in consideration for this.

FIG. 4 is a block diagram showing an AES coprocessor 401 according to the second embodiment. The AES coprocessor 401 is equivalent to the AES coprocessor 201 in FIG. 2. The AES basic arithmetic circuit group 403 processes an AES encryption algorithm and performs two processes, i.e., the initialization process and the normal process.

Generally, as mentioned above, the AES encryption repeatedly performs the following four operations in combination with each other.
  (1) ShiftRow operation
  (2) SubBytes operation
  (3) MixColumns operation
  (4) AddRoundKey operation
Each operation needs to be preceded by the initialization process. As shown in FIG. 4, the AES basic arithmetic circuit group 403 includes circuits for performing the processes. The encryption is performed under the contact usage as follows. The AES basic arithmetic circuit group 403 applies one operation specified by an encryption coprocessor control circuit 407 to data from an intermediate value storage register 406. The AES basic arithmetic circuit group 403 stores a result in the intermediate value storage register 406. The following describes how to perform a process called the round function according to AES.

(1) A ShiftRow initialization circuit 408 initializes the ShiftRow operation in accordance with a value of the intermediate value storage register 406.

(2) A ShiftRow processing circuit 409 performs the ShiftRow operation and stores the result in the intermediate value storage register 406.

(3) A SubBytes initialization circuit 410 initializes the SubBytes operation using the value from the intermediate value storage register 406.

(4) A SubBytes processing circuit 411 performs the SubBytes operation and stores the result in the intermediate value storage register 406.

(5) A MixColumns initialization circuit 412 initializes the MixColumns operation using the value from the intermediate value storage register 406.

(6) A MixColumns processing circuit 413 performs the MixColumns operation and stores the result in the intermediate value storage register 406.

(7) An AddRoundKey initialization circuit 414 initializes the AddRoundKey operation using the value from the intermediate value storage register 406.

(8) An AddRoundKey processing circuit 415 performs the AddRoundKey operation.

Contact Usage fc

Under the contact usage, the above-mentioned processes (1) through (8) are performed every cycle. The entire process requires eight cycles.

Non-Contact Usage fl

Under the non-contact usage, the AES basic arithmetic circuit group 403 changes the mode so as to perform a combination of the initialization operation and the normal operation at one cycle. The AES basic arithmetic circuit group 403 performs the processes (1) through (8) at four cycles.

FIG. 5 diagrams the initialization process and the normal process as examples of the SubBytes operation on the AES basic arithmetic circuit group 403 in FIG. 4.

Contact Usage fc

Under the contact usage, a multiplexer 504 in an AES basic arithmetic circuit group 501 in FIG. 5 selects an input at the 0 side in accordance with the configuration of an AES control register 402. A SubBytes initialization circuit 502 initializes data input from the intermediate value storage register 406 and stores the data as an operation result in an internal register 503. At the next cycle, a SubBytes processing circuit 505 processes the data in the internal register and returns the operation result to the intermediate value storage register 406.

Non-Contact Usage fl

Under the non-contact usage, the multiplexer 504 in FIG. 5 selects an input at the 1 side in accordance with the configuration of the AES control register 402. Data supplied from the intermediate value storage register 406 does not pass the internal register 503. The SubBytes initialization circuit 502 and the SubBytes processing circuit 505 process the data at one cycle. The processed data is returned as an operation result to the intermediate value storage register 406.

There has been described the technique of changing combinations of the initialization operation and the normal operation for each basic operation. The combination of the second embodiment and the first embodiment makes it possible to change combinations of the initialization operation and the normal operation for multiple operations.

Third Embodiment

The third embodiment will be described with reference to FIGS. 6 and 7. According to the third embodiment, the similar idea is also applicable to coprocessors that may process operations such as multiplication, addition, and subtraction useful for the public key encryption.

Figure 6:
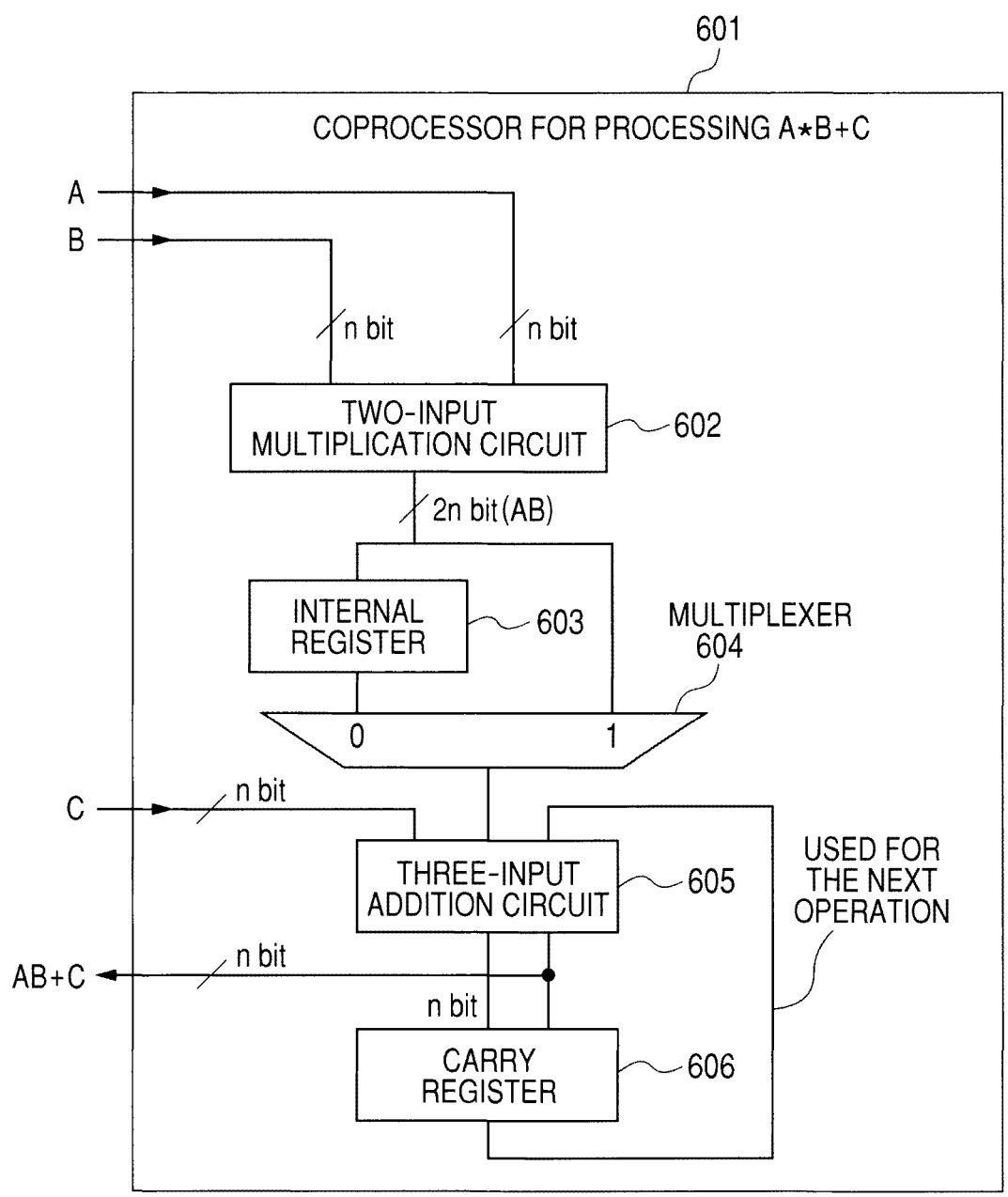
FIG. 6 is a block diagram showing a coprocessor 601 according to a third embodiment.

FIG. 6 shows AB+C as an operation to be processed using n bits as input. FIG. 7 shows AB+CD+E as an operation to be processed using n bits as input.

The following describes the operation in FIG. 6.

Contact Usage fc

Under the contact usage, a multiplexer 604 of a coprocessor 601 selects an input at the 0 side in accordance with the configuration (contact usage) of the control register 102. The intermediate value storage register 106 supplies data A and B. A two-input multiplication circuit 602 multiplies the data A and B together. An internal register 603 stores the operation result. At the next cycle, a three-input addition circuit 605 adds data C from the intermediate value storage register 106 to the data (A*B) in the internal register 603. The three-input addition circuit 605 returns the operation result (A*B+C) to the intermediate value storage register 106.

Non-Contact Usage fl

Under the non-contact usage, the multiplexer 604 of the coprocessor 601 selects an input at the 1 side in accordance with the configuration (contact usage) of the control register 102. At one cycle, the two-input multiplication circuit 602 multiplies data A and B together supplied from the intermediate value storage register 106. The result is not stored in the internal register 603. The three-input addition circuit 605 adds the result to data C from the intermediate value storage register 106. The three-input addition circuit 605 returns the operation result (A*B+C) to the intermediate value storage register 106.

Figure 7:
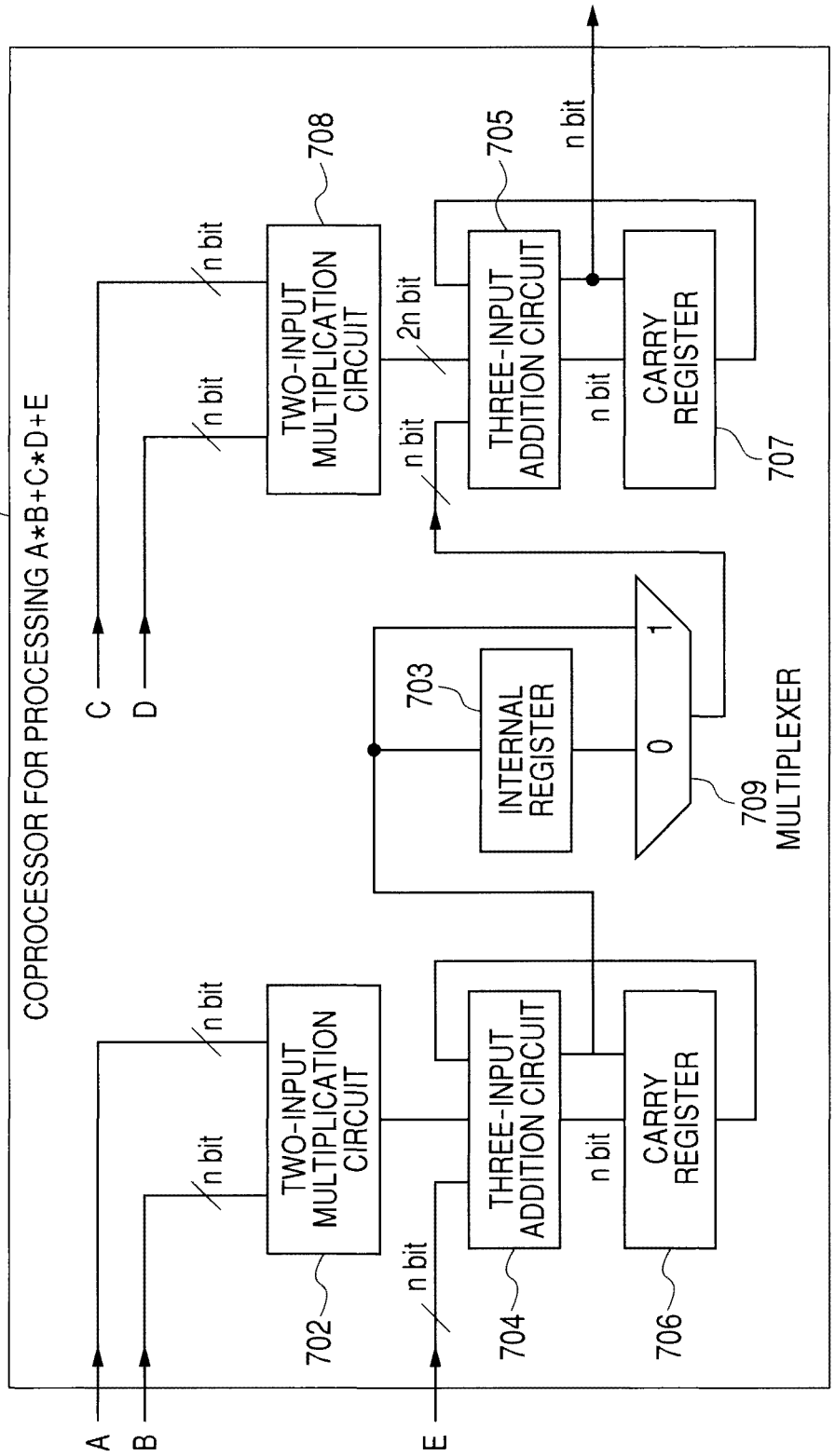
FIG. 7 is a block diagram showing a coprocessor 701 according to the third embodiment.

The following describes the operation in FIG. 7. FIG. 7 shows AB+CD+E as an operation to be processed using n bits as input.

Contact Usage fc

Under the contact usage, a multiplexer 709 of a coprocessor 701 selects an input at the 0 side in accordance with the configuration (contact usage) of the control register 102. Data A, B, and E are supplied from the intermediate value storage register 106. At one cycle, the data A, B, and E pass through a two-input multiplication circuit 702 and a three-input addition circuit 704 and are then stored in an internal register 703. At the next cycle, a three-input addition circuit 705 adds the data (A*B+E) in the internal register and the data (C*D) passing through the two-input multiplication circuit 708 to produce the result (A*B+C*D+E). The result is returned to the intermediate value storage register 106.

Non-Contact Usage fl

Under the non-contact usage, the multiplexer 709 of the coprocessor 701 selects an input at the 1 side in accordance with the configuration (non-contact usage) of the control register 102. In this case, no data is stored in the internal register 703. The operation (A*B+C*D+E) is performed at one cycle. Data A, B, and E are supplied from the intermediate value storage register 106. At one cycle, the data A, B, and E pass through the two-input multiplication circuit 702, the three-input addition circuit 704, and then the multiplexer 709. At this point, the result is A*B+E. The three-input addition circuit 705 adds the result and (C*D) resulting from the two-input multiplication circuit 708. At this point, the result is A*B+C*D+E. The result is returned to the intermediate value storage register 106.

According to the first through third embodiments as mentioned above, changing the operation modes enables the encryption at cycles fewer than those of the contact usage even under the non-contact usage whose operating frequency is lower than that of the contact usage. It is possible to provide IC chips or IC cards capable of high-speed processing even under the non-contact usage.

While the first through third embodiments have described the coprocessor (arithmetic unit) that performs processes by changing the operation modes, an operation of the coprocessor may be interpreted as an embodiment of the arithmetic processing method implemented by the coprocessor (arithmetic unit).

What is claimed is:

1. An IC card comprising:
a central processing unit; and
an arithmetic unit supplied with an arbitrary one clock signal of a high frequency clock signal and a low frequency clock signal from a clock generator and comprising:
registers and
an execution unit,
wherein the central processing unit stores an input data to an input register of the registers and an operation mode information to a control register of the registers for the arithmetic unit,
wherein the arithmetic unit performs an operation in response to the operation mode information using the arbitrary one of the high frequency clock signal and the low frequency clock signal,
when supplied with the high frequency clock signal, the arithmetic unit executes one instruction at each one cycle of the clock signal,
when supplied with the low frequency clock signal, the arithmetic unit sequentially executes more than two instructions at each one cycle of the clock signal,
wherein the operation mode information includes a clock mode information which indicates which one of the high frequency clock signal and the low frequency clock signal is supplied to the arithmetic unit,
wherein the IC card is supplied an operation power by an arbitrary one of contact and non-contact,
wherein when the operation power is supplied by contact, the arithmetic unit executes the instruction by the high frequency clock signal, and
when the operation power is supplied by non-contact, the arithmetic unit executes the instruction by the low frequency clock signal.

2. The IC card according to claim 1,
wherein the arithmetic unit includes plural execution units, each of which executes arithmetic operations different from each other,
wherein when the operation power is supplied by contact, a corresponding one of the execution units performs a predetermined operation thereof at one cycle serially, and
wherein when the operation power is supplied by non-contact, corresponding two or more of the execution units perform the predetermined operation thereof at one cycle in parallel.

* * * * *